United States Patent
de Souza

(10) Patent No.: US 7,076,625 B2
(45) Date of Patent: Jul. 11, 2006

(54) MULTIMEDIA STORAGE DEVICE HAVING DIGITAL WRITE-ONLY AREA

(75) Inventor: Jorge Campello de Souza, Cupertino, CA (US)

(73) Assignee: Hitachi Global Storage Technologies, Amsterdam (NL)

( * ) Notice: Subject to any disclaimer, the term of this patent is extended or adjusted under 35 U.S.C. 154(b) by 361 days.

(21) Appl. No.: 10/615,965

(22) Filed: Jul. 9, 2003

(65) Prior Publication Data

US 2005/0010611 A1    Jan. 13, 2005

(51) Int. Cl.
*G06F 12/14*    (2006.01)

(52) U.S. Cl. ...................................... 711/163
(58) Field of Classification Search ................ 711/163; 713/193, 194
See application file for complete search history.

(56) References Cited

U.S. PATENT DOCUMENTS

| | | | | |
|---|---|---|---|---|
| 4,870,512 A | * | 9/1989 | Yoshio | 360/32 |
| 2001/0026531 A1 | * | 10/2001 | Onodera et al. | 369/284 |
| 2002/0037081 A1 | * | 3/2002 | Rogoff et al. | 380/278 |
| 2003/0012099 A1 | * | 1/2003 | Sako et al. | 369/47.23 |

* cited by examiner

*Primary Examiner*—Hiep T. Nguyen
(74) *Attorney, Agent, or Firm*—John L. Rogitz

(57) ABSTRACT

A multimedia storage device such as a hard disk drive has an unrestricted area that is accessible to client devices outside the device such that digital multimedia stored on the unrestricted area may be accessed by the client devices. Also, the device has a restricted area containing digital multimedia that is at all times inaccessible to the client devices. However, the digital multimedia in the restricted area is accessible only by a controller in the device that always and under all circumstances converts the digital multimedia in the restricted area to analog format prior to permitting a client device to access content embodied by the multimedia.

31 Claims, 2 Drawing Sheets

MULTIMEDIA STORAGE DEVICE HAVING DIGITAL WRITE-ONLY AREA

FIELD OF THE INVENTION

The present invention relates generally to multimedia storage devices.

BACKGROUND OF THE INVENTION

The problem of maintaining rights in digital content that can be easily copied bit for bit is a major one. Since perfect copies can be made of digital multimedia, it is possible to pirate digital content without limit.

Digital rights management (DRM) schemes have been proposed to reduce the magnitude of this billion dollar a year conundrum, including various encryption and decryption schemes. Nonetheless, digital content, regardless of whether it is encrypted, may be copied and stored, and if it happens to be encrypted remains susceptible to eventual decryption by unauthorized parties. This is true regardless of whether CD technology, DVD technology, streaming video technology, HDTV technology, or combinations of these are used. In other words, no matter how strong the DRM scheme, once digital content is made available for transfer, encrypted or not, it remains vulnerable to being "cracked" by a determined copyist.

Having made this critical observation, the invention disclosed herein is provided.

SUMMARY OF THE INVENTION

A device for storing multimedia data includes a data storage medium that has an analog-only read portion. A controller controls the medium and includes digital-to-analog circuitry. The controller permits only the digital-to-analog circuitry to access the analog-only read portion for converting digitized multimedia stored in the analog-only read portion to analog format.

In a preferred embodiment, the analog-only read portion is embodied as a physical portion of the storage medium. It may also be embodied as a logical portion of the storage medium. No digital output path exists on the device from the analog-only read portion except a path connecting the portion to the digital-to-analog circuitry.

The controller and storage medium may be sealed in a housing. The device may be a hard disk drive and the storage medium can be at least one disk. In such an embodiment, the controller can be a hard disk drive controller.

A digital multimedia output terminal may be provided on a housing for permitting access to digital multimedia that is not stored on the analog-only read portion. In contrast, the housing contains no terminal for permitting access from outside the housing to digital multimedia in the analog-only read portion.

In another aspect, a multimedia storage device includes an unrestricted area that is accessible to client devices outside the device such that digital multimedia stored on the unrestricted area may be accessed by the client devices. The multimedia storage device also includes a restricted area which contains digital multimedia that is at all times inaccessible to the client devices. Instead, the digital multimedia in the restricted area is accessible only by a controller in the device regardless of whether the digital multimedia in the restricted area is encrypted. The controller always and under all circumstances converts the digital multimedia in the restricted area to analog format prior to permitting a client device to access content embodied by the multimedia.

In still another aspect, a multimedia player system includes an entertainment system and a multimedia storage device engaged with the entertainment system for receiving requests for multimedia. The storage device transmits multimedia in digital format to the entertainment system unless the multimedia is stored in a restricted area on a storage medium of the storage device, in which case the multimedia is first converted to analog format prior to sending the multimedia to the entertainment system.

In another aspect, a method for providing multimedia content includes providing a data storage device containing the content in digital form. The method includes billing a user for buying the storage device, or renting the storage device, or loading the content onto the storage device. Access to the content in digitized form from outside of the device is prevented. The content can be transmitted outside the storage device but only in analog form.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
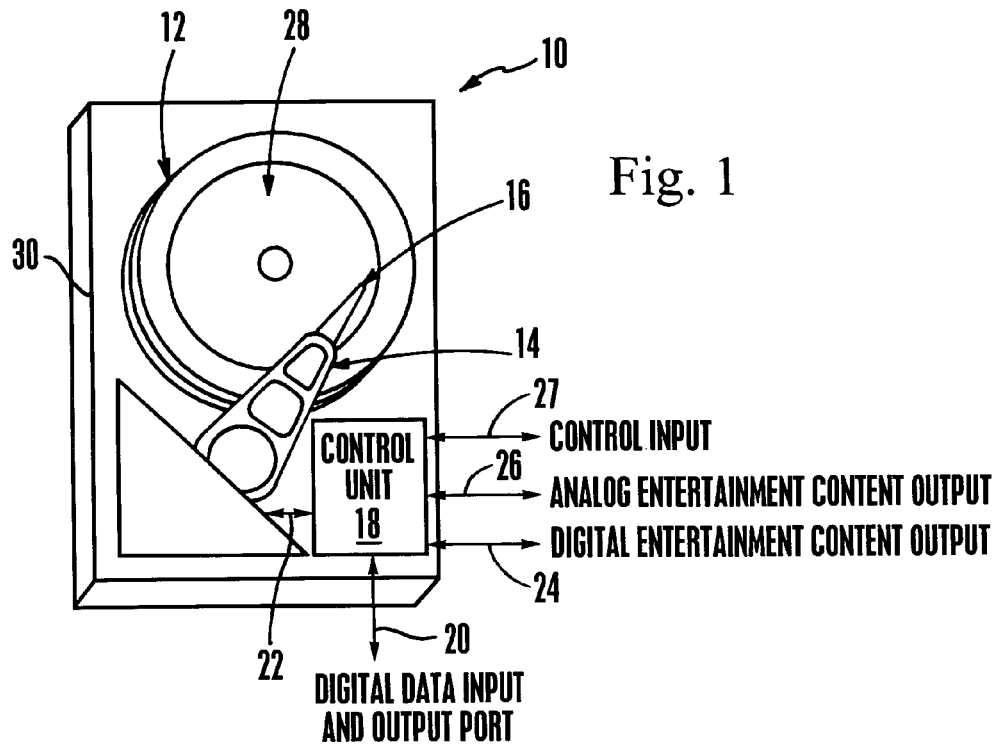
FIG. 1 is a perspective view of an exemplary embodiment of the present storage device, configured as a hard disk drive, with portions of the housing broken away.

Referring initially to FIG. 1, a device is shown, generally designated 10, for storing multimedia and other data on a storage medium 12 that in one embodiment may be implemented by plural storage disks in a hard disk drive. When implemented as a hard disk drive, the device 10 includes an arm 14 having a read/write head 16 on the end thereof in accordance with hard disk drive principles. The data storage region 12 may be managed by a controller 18 that can be a conventional hard disk drive controller modified per the logic below. Or, the controller 18 may be a controller separate from the hard disk drive controller.

The controller 18 may receive input signals at an input/output terminal 20. The data input interface may be, in the case of hard disk drive implementations, serial ATA, with functionality added to it to permit a user to specify which storage region the data is to be sent to. The input signals may include read and write requests from users, including from client devices seeking to play content stored on the device 10. A data input and output path 22 is provided between the controller 18 and the storage medium 12 as more fully discussed below. Also, the controller 18 may output digitized multimedia content, e.g., digitized audio content, at a digital multimedia output terminal 24.

Furthermore, as shown in FIG. 1, the controller 18 may output analog multimedia content at an analog output terminal 26. Also, a control input terminal 27 may be provided for interactive user control such as a game controller. If desired, the functions of the control input terminal 27 may be implemented by the input/output terminal 20.

As set forth further below, analog content is content that is stored in digital form (e.g., MPEG-2 or MPEG-4) in a restricted region 28 of the device 10 that has been converted from digital format to analog format by the controller 18 prior to outputting the content at the terminal 26. No other access to content stored in the restricted region 28 is afforded. That is, digital content may be written to the restricted region 28 but may not be read except by the controller 18 pursuant to converting the content to analog form. Consequently, the restricted region 28 may be thought of as a digital write-only or analog read-only portion of the storage medium 12. In any case, the restricted region 28, whether physically defined or logically defined, is specifically designated "restricted" by the controller 18.

As an example of how the regions above may be used, the audio portion of a movie may be stored on unrestricted regions (i.e., regions other than the restricted region 28) on the storage medium 12 and output in digitized form at the terminal 24, while the video portion of the movie, having been stored in the restricted region 28, is first converted to analog form and then output on the terminal 26. In any case, both the controller 18 and storage medium 12 preferably are contained in an integral tamper resistant housing 30.

It is to be understood that the restricted region 28 may be defined physically, i.e., one disk or one predetermined portion of a disk in a hard disk drive implementation may be designated as "restricted". Incoming multimedia data that is flagged by the content provider as "restricted" is accordingly stored on the restricted region 28 by the controller 18. Alternatively, the restricted region 28 may be logically defined. In other words, incoming multimedia content can be flagged "restricted" or designated as such in a table or other data structure and stored anywhere on the storage medium 12, with the controller 18 subsequently designating that region as being a restricted region 28. In any case, the decision as to whether data may be output from the device 10 in digitized form cannot be changed, but remains fixed at the time data is written to the device 10. In effect, once data is written to the restricted region 28, it is unrecoverable outside the device 10 in digitized form.

Figure 2:
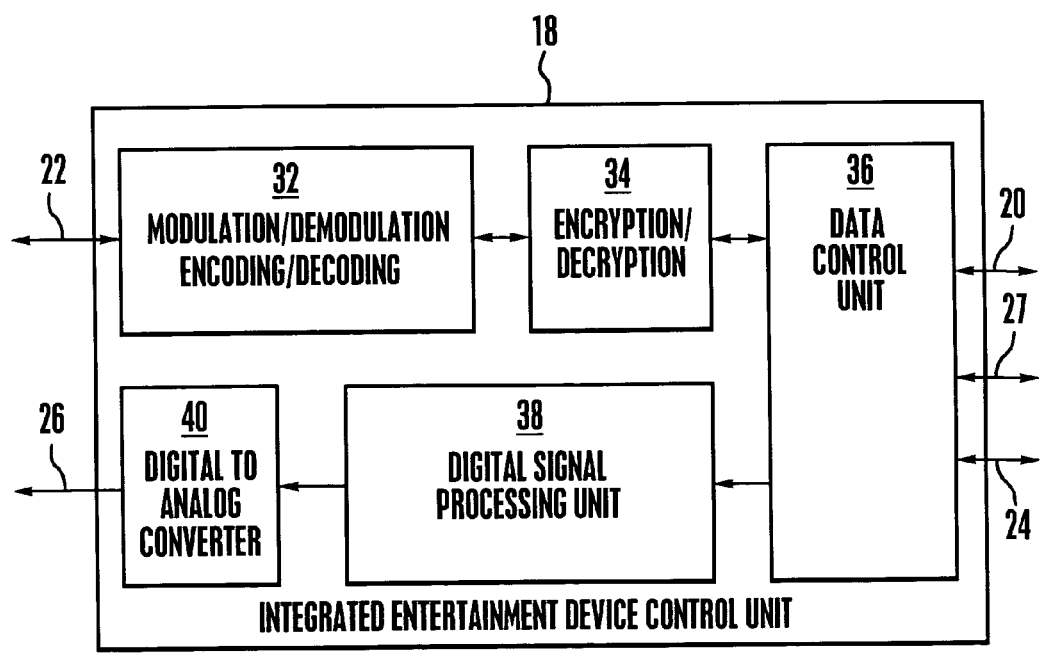
FIG. 2 is a block diagram of the controller.

FIG. 2 shows details of a preferred controller 18. Preferably, the controller 18 is contained on a single tamper resistant chip.

The controller 18 shown in FIG. 2 controls the flow of data in the device 10. The input/output port 27 is for control signals (remote control, game controllers B which may contain physical feedback, such as the Sony PS2 controllers, etc.). Alternatively or in addition, digital signals may be input through the digital input/output port 20. The digital signals are first sent to a data control unit 32 that determines whether the data is to be analog output only or if digital output is authorized. The determination can be made based on codes within the data as provided by the content provider. Once this determination is made, there can be no further changes made to the status of the data.

The digital data then passes through an encryption/decryption module 34. If the data is not already encrypted, then it is encrypted in the module 34. The signal is then sent to a modulation/demodulation and encoding/decoding block 36, where it is converted into an appropriate format to be stored in the physical medium. For example, in a hard disk drive, the data would be converted into an NRZ drive current that is sent to the recording head.

The data is then sent through the digital output port 22, which is the path to the physical storage medium 12. The content is stored on the medium 12 in the restricted region 28 if it is designated "analog output only".

With the above disclosure in mind, the encryption/decryption of the data stored in the physical medium (if not received in an encrypted form) is performed within the controller 18 in the encryption/decryption module 34. In any case, data designated as Aanalog output only" (as well as, if desired, other content) is always stored in encrypted form in the physical medium 12. Therefore, even if someone separates the controller 18 from the physical medium 12, he/she would not be able to access the unencrypted digital content designated as "analog output only".

In one preferred embodiment, the decryption key for a piece of Aanalog output only" content is encrypted with the public key of the device 10 and stored with the data. The private key for the multimedia storage device 10 is stored within the encryption/decryption module 34. The public key is known by those that are providing content and they will in most situations already provide the digital content in encrypted format, together with the encryption key encrypted with the public key of the device 10. As stated above, when the content is received in encrypted form the module 34 does nothing further and simply passes the digital stream along to the modulation/encoding module 36.

When the data is to be output from the multimedia device (in either analog or digital format) the controller 18 retrieves the encrypted content from the physical medium, processes the read-back signal in the module 36, and then the encrypted digital data is sent to the encryption/decryption module 34 for decryption. Along with the data comes the decryption key encrypted with the public key of the device 10. The encryption/decryption module 34 then uses the private key of the device 10 (that only the module 34 knows) to decrypt the decryption key for the associated piece of content, with which the encryption/decryption modules 34 then decrypts the digital content. The digital signal is then sent to the data control unit 32.

In accordance with the present invention, the control unit 32 verifies the type of content, i.e., content that is to be output only in analog form (that is, content that would have been stored in the restricted region 28) or content that may be output in digital form. If the content is designated for analog output only, the digital stream is sent to a digital signal processor (DSP) unit 38, which is responsive to user requests for typical playback functions such as play, rewind, fast forward, and pause. From the DSP 38 the content is sent to a digital to analog converter (DAC) 40 for conversion into analog format prior to being output at the analog output terminal 26.

To enhance the security of the system, at least the encryption/decryption module 34 and the digital-to-analog conversion module 40 preferably are contained within a single tamper-resistant module, such as a single chip. This means that digital content designated as "analog output only" is never in the clear within the device 10 in the sense that it is not feasible for someone to open the device 10 and probe the data-path to obtain the decrypted digital stream.

Figure 3:
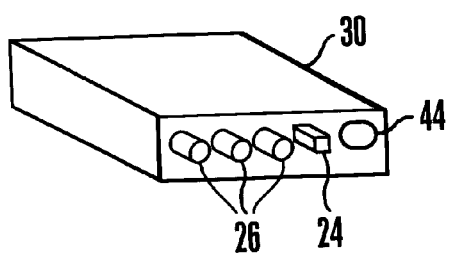
FIG. 3 is a perspective view of the front end of the storage device in a stand alone embodiment.
Figure 4:
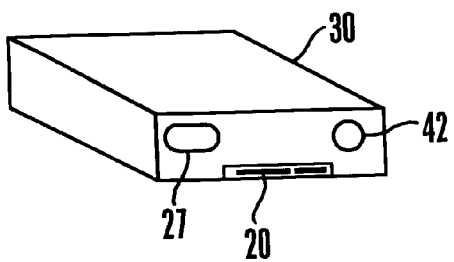
FIG. 4 is a perspective view of the rear end of the storage device shown in FIG. 3.

FIGS. 3 and 4 show the front and back, respectively, of the device 10 when it is configured as a stand alone device. As shown in FIG. 4, the digital input/output port 20 may be a standard hard disk drive I/O port in HDD implementations. The device may also include the gaming control I/O port 27. A power connector 42 is also provided to supply power to the device 10.

As shown in FIG. 3, protruding from the housing 30 are the analog output terminal 26 and digital multimedia output terminal 24. A remote control command signal receiver 44 such as an IR receiver can also be provided to receive user requests for content. In the embodiment shown in FIGS. 3 and 4, a user could, for example, load content into the device 10 at a loading station such as a video store and then take it home and connect it to a TV monitor or other playback device.

Figure 5:
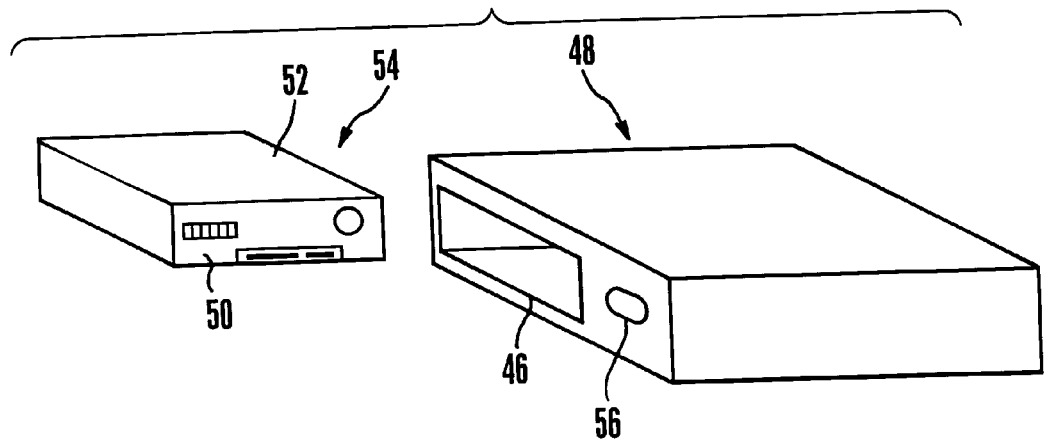
FIG. 5 is an exploded perspective view of a storage device with associated player.
Figure 6:
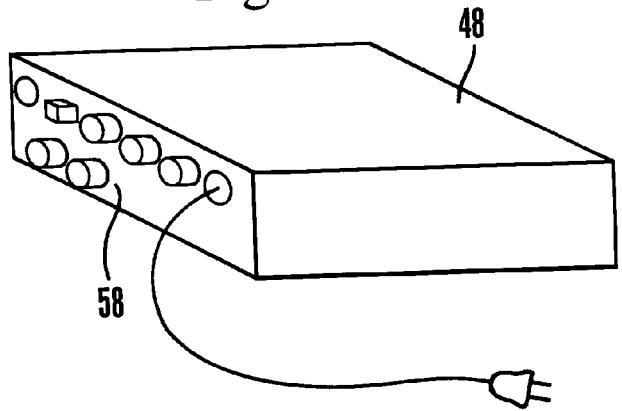
FIG. 6 is a perspective view from another angle of the player shown in FIG. 5.

FIGS. 5 and 6 show that the multimedia storage device of the present invention may be engaged with a bay 46 of a playback device 48. In this embodiment, the output terminals discussed above can be replaced by an integrated digital/analog output panel 50 on a housing 52 of a device 54 that is in all other essential respects identical to the storage device 10 discussed above. The panel 50 engages complementary structure in the bay 46 to facilitate communication between the devices 48, 54 shown in FIG. 5. The playback device 48 may further include a remote control command signal receiver 56 such as an IR receiver. As best shown in FIG. 6, standard connectors 58 including analog video output, digital audio output, digital control input/output, analog audio output, and S-video output can protrude from the playback device 48 for connecting the device 48 to a television or other display apparatus.

In non-limiting exemplary embodiments, the controller of the storage device 10 or 54 may also include a security mechanism that allows it to unequivocally identify itself, exchange secret keys in a secure manner, and unequivocally authenticate itself in accordance with authentication principles known in the art. Specifically, taking the device 10 as an example, the device 10 may implement a set of standard cryptographic protocols, but can incorporate them into an overall protection scheme for HDD storage. The main characteristics of this scheme are that N different handshake protocols (such as PKI systems) may be implemented in the device 10, but only K<=N of these handshake protocols have to be successful for the device 10 to authorize data to be written. These handshake protocols also serve the purpose of identifying the device as a true device 10, thus avoiding rogue storage devices from posing as a legitimate device to trick the content dispenser into providing the digital content to it. These handshake protocols may also be used to provide the decryption keys to the digital content that is stored in the analog only output region.

If further desired and as mentioned above, to insure that the digital content is never made available, the device 10 may preferably be built in a way that prevents the controller 18 from being separated from the storage medium 12.

The preferred non-limiting device 10 is designed so that the sequencing of the content streams is controlled by the user, but only to the extent permissible by the content creator. The restrictions to the sequencing operations, such as play, rewind, fast forward, skip forward, go to a specific time/scene are established at the time the content is loaded into the device 10. For example, the device 10 can be instructed to disable the fast forward, skip forward and related function for the Copyright message at the beginning of the content display. Another use of this restriction mechanism is to disallow the same functions (i.e., fast forward, skip forward, go to a specific time/scene, etc) during the playback of commercial segments. The cost of the rental could be reduced for those willing to watch the video with commercial advertisement blocks, much the same way as commercial advertisements blocks are inserted in broadcast video streams.

Furthermore, if desired the device 10 can give the content dispenser (at the video store) the ability to include its own advertisements. This new advertisement stream can be included in a variety of ways, such as at the beginning of the playback of the video in much the same way trailers are shown at the beginning of movie theater feature presentations. This gives the video rental store the ability to include local advertisements as well as the ability to customize the advertisements to the particular geographic location where the video store is located or even customize it to the viewer that is renting the video.

The preferred device 10 can set expiration times for stored pieces of multimedia data if desired. When the content is loaded into the device 10 a counter can be initiated to determine when the data can no longer be accessed or played in analog format. After the expiration time, the data can be erased or otherwise rendered effectively inaccessible. The expiration time can be either relative, i.e., a given amount of time after being loaded or absolute, i.e., at a given time.

In addition to the time based expiration, expiration can be established through usage. That is, a given piece of content may only be accessed a pre-specified number of times. As an example, a rented video can be allowed to play only three times before it expires.

If desired, the above two expiration methods can be combined. That is, expiration rules can be set as a function of both usage and time. As an example, the content can be set to expire 48 hours after it is first accessed.

The expiration rules described above can be used in a mode where they are only applied to the decryption keys for the pieces of content. This way, once the content is expired the content dispenser only needs to reload the decryption key for the piece of content, instead of the data for the content itself.

With the above invention, multimedia content in digitized form can be provided, and a user then billed for buying the storage device, or renting the storage device, or loading the content onto the storage device. Access to the content in digitized form from outside of the device is prevented. The content can be transmitted outside the storage device but only in analog form.

While the particular MULTIMEDIA STORAGE DEVICE HAVING DIGITAL WRITE-ONLY AREA as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. '112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconcilable with the present specification and file history.

What is claimed is:

1. A device for storing multimedia data, comprising:
 a data storage medium, the medium having at least one analog-only read portion; and
 a controller controlling the medium and including digital-to-analog circuitry, the controller permitting only the digital-to-analog circuitry to access the analog-only read portion for converting digitized multimedia stored in the analog-only read portion to analog format.

2. The device of claim 1, wherein the analog-only read portion is embodied as a physical portion of the storage medium.

3. The device of claim 1, wherein the analog-only read portion is embodied as a logical portion of the storage medium.

4. The device of claim 1, wherein no digital output path exists on the device from the analog-only read portion except a path connecting the portion to the digital-to-analog circuitry.

5. The device of claim 1, wherein the controller and storage medium are sealed in a housing.

6. The device of claim 5, wherein the device is a hard disk drive and the storage medium is at least one disk.

7. The device of claim 6, wherein the controller is a hard disk drive controller.

8. The device of claim 1, further comprising a digital multimedia output terminal on a housing holding the storage medium and the controller for permitting access to digital multimedia not stored on the analog-only read portion.

9. The device of claim 5, wherein the housing contains no terminal for permitting access from outside the housing to digital multimedia in the analog-only read portion.

10. The device of claim 1, wherein after an expiration time, the digitized multimedia stored in the analog-only read portion is rendered effectively inaccessible.

11. A multimedia storage device, comprising:
 an unrestricted area accessible to client devices outside the device such that digital multimedia stored on the unrestricted area may be accessed by the client devices; and
 a restricted area containing digital multimedia that is at all times inaccessible to the client devices, the digital multimedia in the restricted area being accessible only by a controller in the device, the controller always and under all circumstances converting the digital multimedia in the restricted area to analog format prior to permitting a client device to access content embodied by the multimedia.

12. The device of claim 11, comprising a controller controlling the medium and including digital-to-analog circuitry, the controller permitting only the digital-to-analog circuitry to access the restricted area for converting digitized multimedia stored in the restricted area to analog format.

13. The device of claim 12, wherein the restricted area is embodied as a physical portion of the storage medium.

14. The device of claim 12, wherein the restricted area is embodied as a logical portion of the storage medium.

15. The device of claim 12, wherein no digital output path exists on the device from the restricted area except a path connecting the portion to the digital-to-analog circuitry.

16. The device of claim 12, wherein the controller and storage medium are sealed in a housing.

17. The device of claim 16, wherein the device is a hard disk drive and the storage medium is at least one disk.

18. The device of claim 17, wherein the controller is a hard disk drive controller.

19. The device of claim 12, further comprising a digital multimedia output terminal on a housing holding the storage medium and the controller for permitting access to digital multimedia in the unrestricted area.

20. The device of claim 16, wherein the housing contains no terminal for permitting access from outside the housing to digital multimedia in the restricted area.

21. The device of claim 11, wherein after an expiration time, the digitized multimedia stored in the restricted area is rendered effectively inaccessible.

22. A multimedia player system, comprising:
 an entertainment system; and
 a multimedia storage device engaged with the entertainment system for receiving requests for multimedia, the storage device transmitting multimedia in digital format to the entertainment system unless the multimedia is stored in a restricted area on a storage medium of the storage device, in which case the multimedia is first converted to analog format prior to sending the multimedia to the entertainment system, wherein no digital output path exists on the multimedia storage device from the restricted area except a path connecting the portion to the digital-to-analog circuitry.

23. The system of claim 22, comprising a controller controlling the medium and including digital-to-analog circuitry, the controller permitting only the digital-to-analog circuitry to access the restricted area for converting digitized multimedia stored in the restricted area to analog format.

24. The system of claim 23, wherein the restricted area is embodied as a physical portion of the storage medium.

25. The system of claim 23, wherein the restricted area is embodied as a logical portion of the storage medium.

26. The system of claim 22, wherein after an expiration time, the multimedia stored in the restricted area is rendered effectively inaccessible.

27. The system of claim 23, wherein the controller and storage medium are sealed in a housing.

28. The system of claim 27, wherein the multimedia storage device is a hard disk drive and the storage medium is at least one disk.

29. The system of claim 28, wherein the controller is a hard disk drive controller.

30. The system of claim 23, further comprising a digital multimedia output terminal on a housing holding the storage medium and the controller for permitting access to digital multimedia in the unrestricted area.

31. The system of claim 27, wherein the housing contains no terminal for permitting access from outside the housing to digital multimedia in the restricted area.

* * * * *